Dec. 17, 1929.                A. NUTT                1,739,690
                            OILING SYSTEM
                         Filed Feb. 24, 1927

INVENTOR
ARTHUR NUTT
BY
ATTORNEY

Patented Dec. 17, 1929

1,739,690

UNITED STATES PATENT OFFICE

ARTHUR NUTT, OF KENMORE, NEW YORK, ASSIGNOR TO CURTISS AEROPLANE & MOTOR COMPANY, INC., A CORPORATION OF NEW YORK

OILING SYSTEM

Application filed February 24, 1927. Serial No. 170,516.

My invention relates to internal combustion motors.

Heretofore, in internal combustion motors, and especially in aeronautical internal combustion motors, considerable difficulty has been experienced in directing onto the crank shaft bearing surface that amount of oil required for its proper lubrication. In most cases, where the conventional full pressure oiling system is used, the crank shaft bearing surface, instead of being under-lubricated, receives an over-supply of oil. Usually, oil is fed under pressure directly onto the crank shaft bearing surface, thence thru radial oil holes formed in the crank shaft journal to the interior of the crank shaft which is hollow, and thence thru oil tubes leading off from said hollow journal to the bearings for the connecting rod ends. Such an arrangement or system, while satisfactory from the standpoint of abundant lubrication, is unsatisfactory as being wasteful and uneconomical. The radial oil holes (usually three or more in number and equidistantly spaced) which function as oil inlet passages, functional also as oil outlet passages, and hence permit (during that period of each complete revolution of the crank shaft when said openings are out of registry with the oil supply duct) of the escape of an excess amount of oil onto said bearing surface. As said bearing surface is properly and completely lubricated thru the escape thereonto of only a small quantity of oil, obviously considerable oil waste is encountered where a large volume of oil is permitted to escape thru said passages.

The present invention, as distinguished from such prior practice, contemplates an oiling system in which only that amount of oil necessary to the proper lubrication of the crank shaft bearing surface, and no excess, is liberated or directed thereonto. In many respects the improved oiling system is quite similar to the oiling system above briefly described. It is generally similar in that oil is circulated under pressure and liberated directly onto the bearing surface exactly as heretofore. Instead, however, of providing a plurality of oil holes in the crank shaft journal, said journal is provided with but a single oil hole formed therein at the high pressure point of the bearing, i. e., at a point in the plane of the resultant of the centrifugal forces produced by the rotation of the crank cheeks, connecting rods and connecting rod journals formed on the crank shaft in proximity to said bearing surface. By providing but the one oil hole in the journal wall, and by forming such hole in said journal wall at the high pressure point of the bearing, the oil, when once admitted to the hollow crank shaft, cannot escape therefrom onto the crank shaft bearing surface except in that quantity desired. From the hollow journal the oil is conducted, in the usual manner, to the connecting rod journals. In thus curtailing the back flow of oil from the hollow journal onto the crank shaft bearing surface, its over-lubrication is prevented.

In the drawings, wherein like reference characters denote like or corresponding parts, Fig. 1 is a side elevation of a portion of a motor crank shaft showing the relation thereto of that portion of the oiling system by means of which one of the bearings of the crank shaft is lubricated;

While the invention is illustrated in connection with one of the intermediate bearings of the crank shaft of a multi-cylinder internal combustion engine, it is not intended that the invention should be thus limited. Obviously, if desired, the same practice could be followed out in connection with one of the end bearings of the crank shaft.

Figure 1:
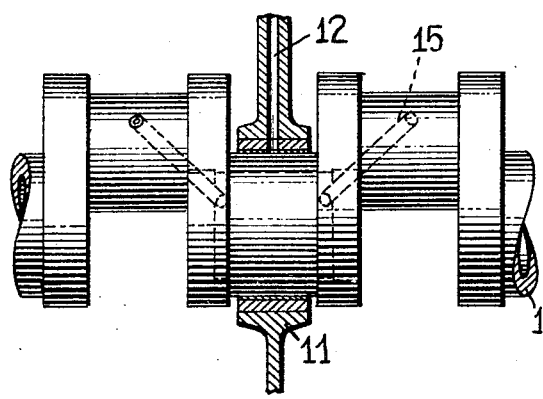

In Fig. 1, the crank shaft, designated in its entirety as 10, is hollow throughout. Said crank shaft at its opposite ends, as well as at one or more points intermediately of its ends, is mounted in suitable bearings 11 (but one of which, an intermediate bearing, is shown). Oil is directed onto said bearing under pressure, an oil supply duct 12 being formed in the bearing web for this purpose. By terminating said oil duct 12 at said bearing in the manner indicated, said bearing surface is partially lubricated. That portion of the crank shaft engaging in said bearing 11 may properly be termed the crank shaft journal. Said journal, the hollow of which is designated as 13, has formed in its outer wall an oil hole 14 which, during rotation of the crank shaft, is adapted to register with said oil supply duct 12. By means of said oil hole 14, oil is admitted to the hollow of said journal. Said oil hole 14, as previously explained, is formed in the journal wall in the plane of the resultant of the centrifugal forces produced by the rotation of the crank shaft off-sets as it is in this plane that said journal wall most firmly engages with said bearing surface. From said hollow journal oil is fed laterally thru oil tubes 15 to the connecting rod bearings (the journals only of which are shown) and also, thru said oil hole 14, in the desired quantity, onto said bearing surface.

Figure 2:
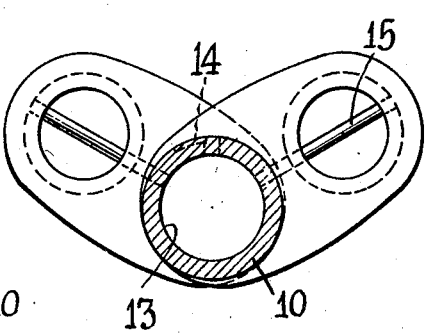
Fig. 2 is an end view (with the crank shaft in section) of the structure illustrated in Fig. 1.
Figure 3:
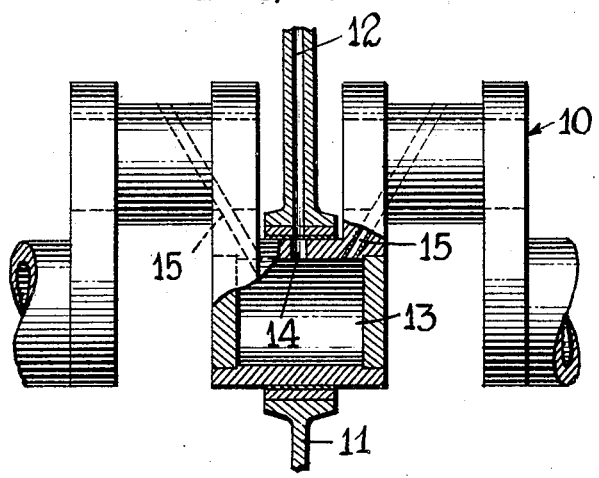
Fig. 3 is a view similar to Fig. 1 in which the crank shaft "off-sets" extend parallel instead of at an angle to each other as indicated in Figs. 1 and 2.
Figure 4:
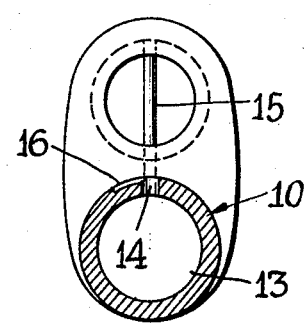
Fig. 4 is a view similar to Fig. 2 of the structure illustrated in Fig. 3.

In Figs. 1 and 2 of the drawings the off-sets of the crank shaft extend out radially from its axis at an angle. Where the off-sets are thus angularly disposed the oil hole 14 is located as indicated in Fig. 2. Where the off-sets extend off from the crank shaft axis in parallelism as shown in Figs. 3 and 4, the oil hole 14, instead of lying in an intermediate plane as shown in Fig. 2, is formed in said journal wall in line with said parallel off-sets. Moreover, if desired, to increase the amount of oil admitted to the hollow journal of the crank shaft, said journal may have formed in its outer wall a circumferential groove 16 which at one end is open to the oil hole 14 and which, in its relation to said supply duct, is so formed in the journal wall as to prolong the period during which oil is admitted to said hollow journal thru said oil hole. The provision of but a single oil hole in the crank shaft journal and its location at the high pressure point of the bearing, however, is the crux of my invention.

From the above it will be noted that the oil upon entering the hollow crank shaft journal cannot escape therefrom onto the bearing surface 11 in such volume as to admit of an over-lubrication of the bearing surface. The fact that the oil hole 14 is formed in the journal wall at the high pressure point of the bearing prevents an excess back flow of oil thru said oil hole when said oil hole is out of registry with the supply duct 12. Accordingly it will be seen that all oil waste in the lubrication of the crank shaft bearing surface is eliminated.

While I have described my invention in detail in its present preferred embodiment, it will be obvious to those skilled in the art after understanding my invention, that various changes and modifications may be made therein without departing from the spirit or scope thereof. I aim in the appended claim to cover all such modifications and changes.

What I claim is:

A crank shaft comprising a hollow main bearing portion, a crank cheek at each end of said bearing portion, and a crank pin at the outer end of each crank cheek; said crank cheeks and said crank pins collectively providing at each side of said bearing portion a crank shaft offset to which is fastened a connecting rod; said main bearing portion having formed therein, at that side thereof off from which the crank cheeks extend and at a point in the plane of the resultant of the centrifugal forces produced by the rotation of said crank shaft offsets and said connecting rods, an oil inlet passage open at one end to the hollow of said bearing portion; said oil passage constituting the only oil inlet passage leading into the hollow of said bearing and said oil inlet passage, due to the centrifugal forces produced by the rotation of said crank shaft offsets and said connecting rods, being constantly held with its inlet end in firm bearing contact within the bearing surface within which said main bearing portion is held, whereby a minimum of oil is liberated onto said bearing surface as said bearing portion revolves; and an oil supply duct terminating at said bearing surface for supplying oil to said oil inlet passage once only during each complete revolution of the crank shaft.

In testimony whereof I hereunto affix my signature.

ARTHUR NUTT.